United States Patent
McKee et al.

[11] Patent Number: 5,712,981
[45] Date of Patent: Jan. 27, 1998

[54] NETWORK ANAYSIS METHOD FOR IDENTIFYING GLOBAL AND LOCAL NODE SERVERS AND FOR DETERMINING A RECONFIGURED NETWORK TO PROVIDE IMPROVED TRAFFIC PATTERNS

[75] Inventors: Neil H. McKee, Bristol, England; Peter Phaal, San Francisco, Calif.

[73] Assignee: Hewlett-Packard Company, Palo Alto, Calif.

[21] Appl. No.: 667,340

[22] Filed: Jun. 20, 1996

Related U.S. Application Data

[63] Continuation of Ser. No. 207,369, Mar. 7, 1994, abandoned.

[30] Foreign Application Priority Data

Mar. 8, 1993 [EP] European Pat. Off. ............ 93301715

[51] Int. Cl.$^6$ .................................................. H04J 3/02
[52] U.S. Cl. ...................... 395/200.15; 395/200.13; 395/200.02; 395/200.1
[58] Field of Search .................. 395/200.01, 200.02, 395/200.1, 200.15; 370/229, 232, 233, 234

[56] References Cited

U.S. PATENT DOCUMENTS

| | | | |
|---|---|---|---|
| 4,827,411 | 5/1989 | Arrowood et al. | 395/600 |
| 4,914,571 | 4/1990 | Baratz et al. | 395/600 |
| 4,991,204 | 2/1991 | Yamamoro et al. | 379/221 |
| 5,049,873 | 9/1991 | Robin et al. | 340/825.06 |
| 5,079,765 | 1/1992 | Nakamura | 370/85.13 |
| 5,088,091 | 2/1992 | Schroeder et al. | 376/94.3 |
| 5,109,483 | 4/1992 | Baratz et al. | 395/200 |
| 5,276,789 | 1/1994 | Besaw et al. | 395/140 |
| 5,315,580 | 5/1994 | Phaal | 370/13 |
| 5,355,371 | 10/1994 | Auerbach et al. | 370/60 |
| 5,365,523 | 11/1994 | Derby et al. | 370/85.2 |
| 5,450,408 | 9/1995 | Phaal | 370/85 |

FOREIGN PATENT DOCUMENTS 0 480 555 A1  2/1991  European Pat. Off. .

OTHER PUBLICATIONS

"Heuristic Layout Algorithms for Network Management Presentation Services", G. Kar et al., IEEE Network 1 (1988) Nov. No. 6, New York, NY.
"Partition Detection and Optimistic Commit for Dynamically Reconfigurable Distributed Databases", D. Wong, ACTES/Proceedings Symposium 1988 ACM Sigsmall/PC Cannes, France May 4–6, 1988.
European Search Report –EP App. No. EP 93 30 1715.

*Primary Examiner*—Alyssa H. Bowler
*Assistant Examiner*—Richard J. Gregson

[57] ABSTRACT

A network analysis method is applied to traffic data collected in respect of a network of the type comprising a plurality of logical segments each with a plurality of nodes. The method involves processing the traffic data by preferentially removing traffic associated with nodes identified as acting as global servers, and using the remaining traffic to identify nodes acting as local servers. Upon the local servers being identified, the network analysis method carries out further processing to make suggestions as to whether any of these local servers should be moved to another logical segment and as to whether it would be worthwhile splitting a segment between two associated local servers.

19 Claims, 13 Drawing Sheets

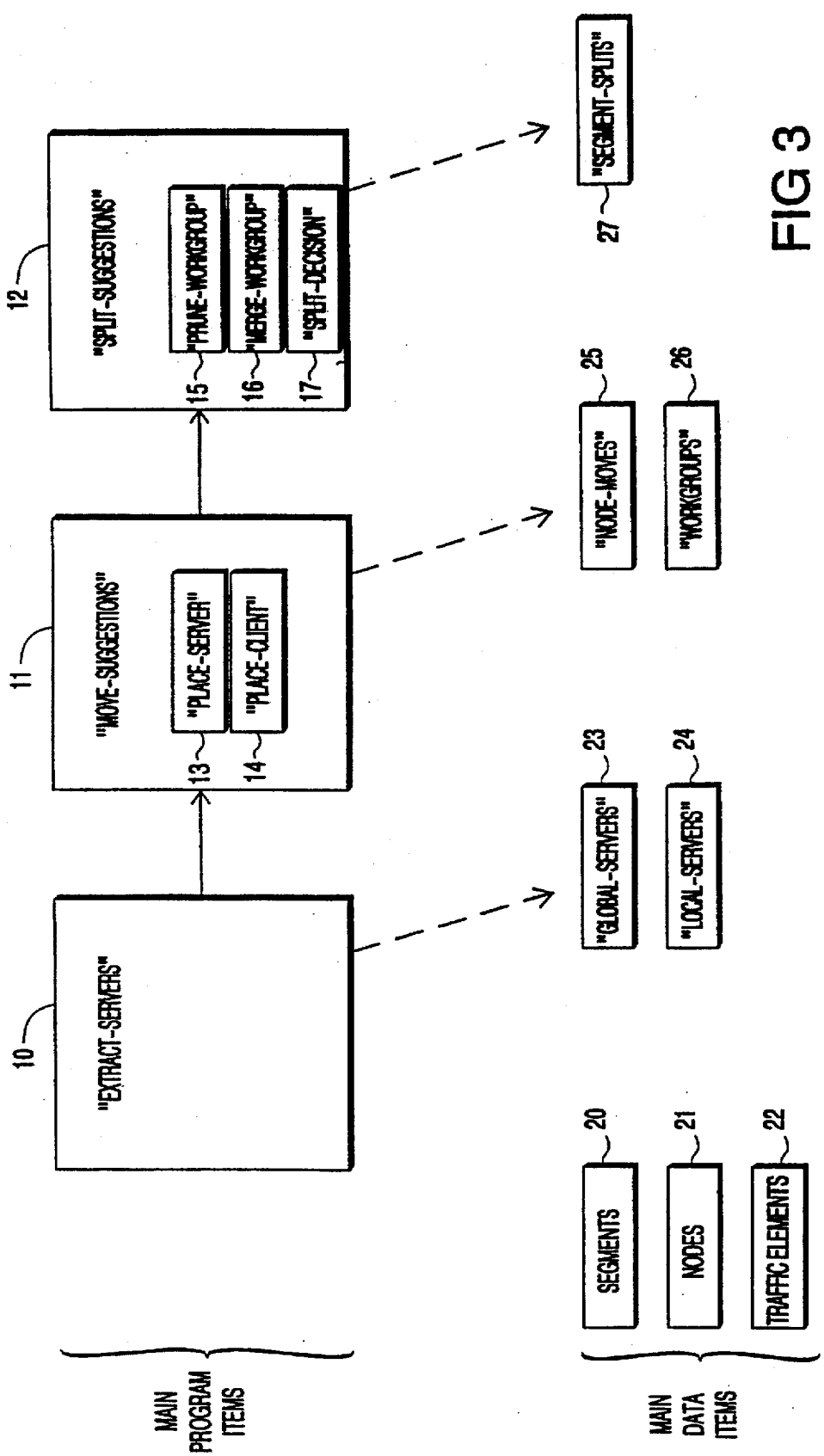

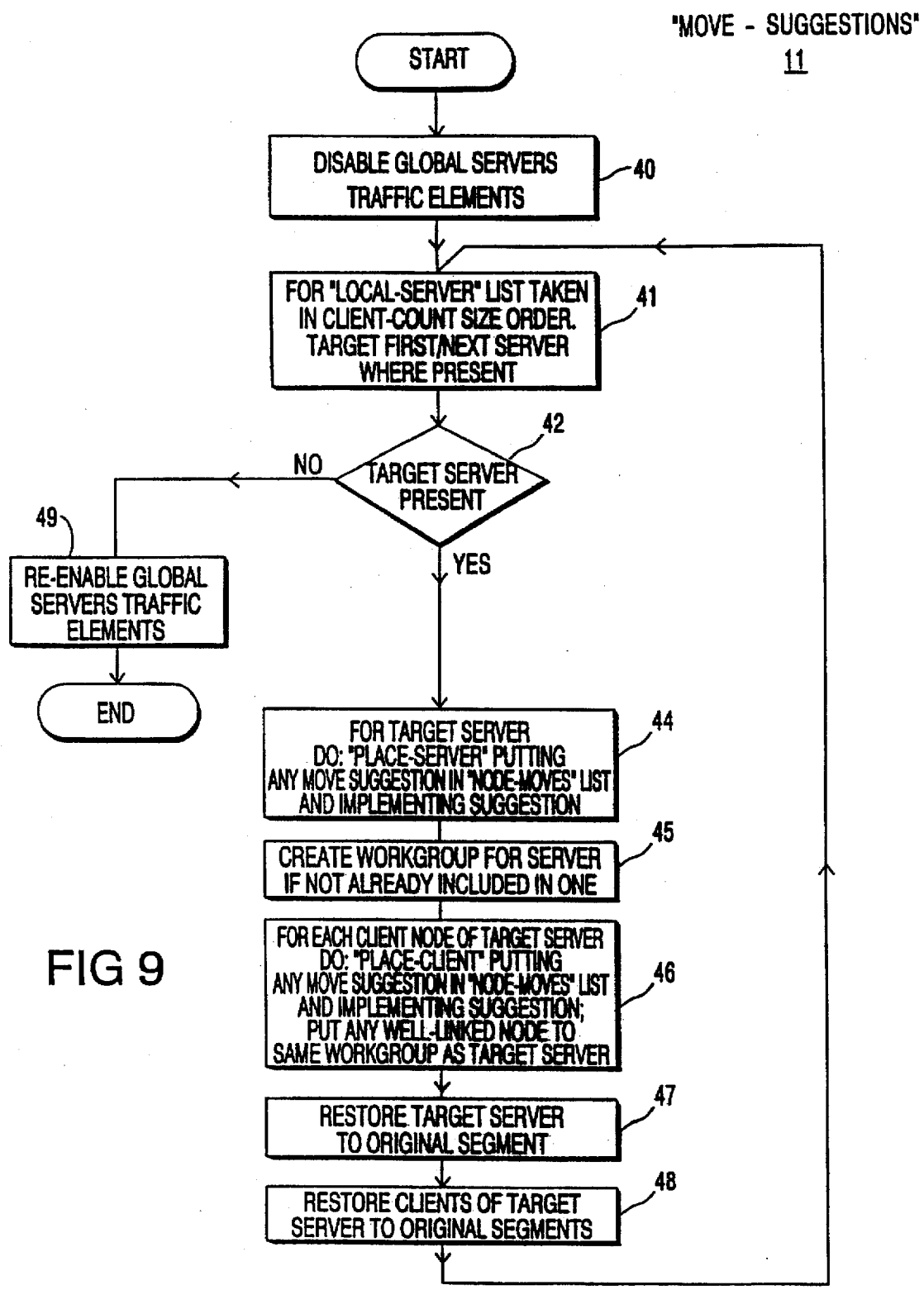

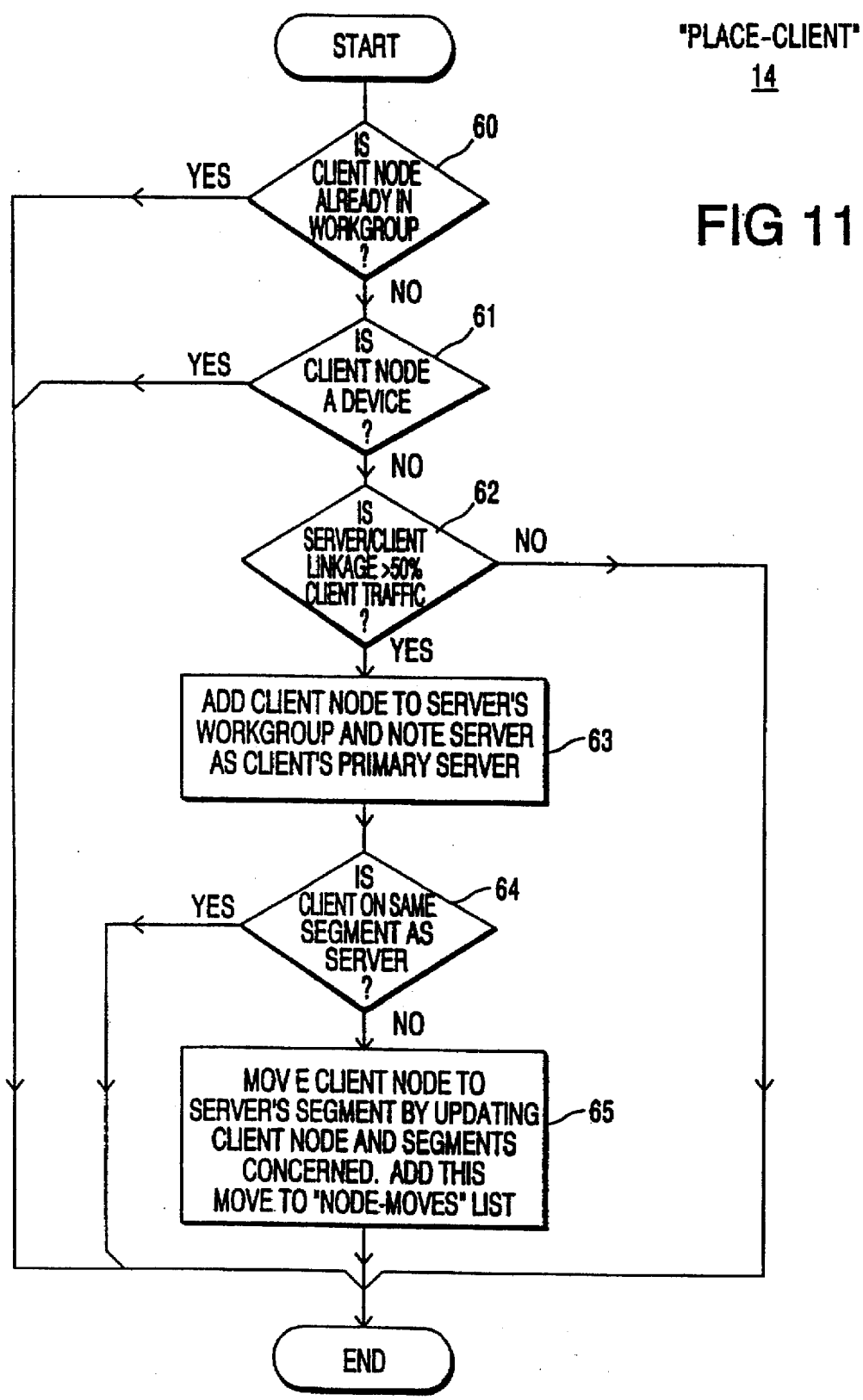

5,712,981

NETWORK ANAYSIS METHOD FOR IDENTIFYING GLOBAL AND LOCAL NODE SERVERS AND FOR DETERMINING A RECONFIGURED NETWORK TO PROVIDE IMPROVED TRAFFIC PATTERNS

This is a continuation of application Ser. No. 08/207,369 filed on Mar. 7, 1994, now abandoned.

The present invention relates to a network analysis method for use in relation to a network of the type comprising a plurality of sub-networks each with a plurality of nodes.

The network analysis method of the invention has particular application to networks where the component sub-networks are logical segments interconnected by bridges operating at level 2 of the seven layer OSI Reference Model. However, the network analysis method can also be used in appropriate circumstances with other networks such as Internet networks with "IP" sub-networks interconnected by routers or gateways operating at level 3 of the OSI Reference Model.

As network monitoring systems become more and more sophisticated and comprehensive, the network operator has an increasing problem identifying significant data amongst the volumes of data on network operation provided by such monitoring systems. This is particularly so where the network concerned comprises several sub-networks with certain nodes acting as global servers across all sub-networks as in such cases it is difficult to get a true picture of what is really happening on each sub-network.

It is an object of the present invention to provide a network analysis method that facilitates an appreciation of operation of the network at a sub-network level.

SUMMARY OF THE INVENTION

To this end, in one aspect the present invention provides a network analysis method that serves to identify nodes acting as local servers, that is, nodes that predominantly deal with one particular sub-network. More particularly, in this aspect the present invention provides a network analysis method for use in relation to a network of the type comprising a plurality of sub-networks each with a plurality of nodes, the method comprising the steps of:

(1) monitoring the network to collect and store traffic data indicative of the linkage between nodes as judged by traffic therebetween; and (2) processing the traffic data by preferentially removing traffic associated with nodes identified as acting as global servers, and using the remaining traffic to identify nodes acting as local servers.

The preferential removal of the global server traffic effectively unmasks the local servers enabling them to be identified.

Step (2) of the method preferably involves examining the traffic data to identify any candidate global server amongst said nodes where a candidate global server is a node whose linkage to any of said sub-networks is less than a first predetermined portion (generally 50%) of its total linkage to all nodes, and where a said candidate global server is identified, identifying the candidate global server with the highest total linkage, removing its associated traffic from the traffic data, and returning to the start of step (2) to repeat the step using the traffic data so modified;

where no such candidate global server is identified, examining the traffic data to identify any candidate local server amongst said nodes where a candidate local server is a node for which for the sub-network with the highest linkage thereto, this linkage is equal to or greater than a second predetermined portion (again, generally 50%) of the total linkage of that candidate local server, and where a said candidate local server is identified, identifying the candidate local server with the highest linkage (advantageously, highest total linkage, but alternatively, highest linkage to any one sub-network), recording this candidate as a local server, removing its associated traffic from the traffic data, and returning to the start of step (2) to repeat the step using the traffic data so modified;

where no said candidate local server is identified, exiting step (2).

The linkage of a node with other associated nodes will generally be measured in terms of at least one of the following: number of associated nodes; number of frames involved in the traffic with the associated nodes; number of bytes involved in the traffic with the associated nodes. For example, linkage may be measured in terms of number of associated nodes but with a traffic volume measurement (frames/bytes) being used to resolve situations where there is a tie between two linkage values being compared.

Although judgement as to whether a node is acting as a server can be based entirely on relative traffic linkages, preferably the monitoring of the network is carried out in such a manner as to enable role information to be gathered indicative of whether a node is acting in a server or client role in relation to individual traffic items associated therewith. In this case, the identification of a node as a global or local server in step (2) is effected without reference to traffic for which the node is acting as a client as indicated by said role information. The role information is, for example, derived on the basis of the "well known port" status of the node end points associated with traffic passed between a pair of nodes, one node of this pair being identified as acting in a server role and the other node in a client role where the end point for said one node is a well known port whilst the other end point is otherwise.

Once the local servers have been identified, then further analysis can be effected to determine how network performance may be improved. Thus, advantageously for at least one of the local servers identified in the main method step (2), a determination is made as to the optimum sub-network for this local server, this determination involving notionally locating the local server concerned on each sub-network in turn and evaluating for each such location of the local server, a predetermined optimal-location function that provides a measure of the traffic between sub-networks that would be associated with the local server in its current notional location, such determination further involving identifying as said optimum sub-network that sub-network for which evaluation of said function indicates a minimum for said traffic between sub-networks. For simplicity and speed, the optimum-location function is, preferably, a count of nodes that have linkage with the local server concerned and are located on sub-networks other than the one corresponding to the current notional location of the local server.

Upon the optimum sub-network for a local server being determined, a determination is advantageously also made as to whether, if this local server is located on its said optimum sub-network, any of the nodes to which is has linkage as a server, should also be moved to said optimum sub-network. This determination involves testing for each node whether the linkage between that node and the local server is substantially half or more of the total linkage of that node.

Another useful analysis that can be effected once the local servers have been identified is to associate the local servers and their client nodes into workgroups. To this end, each local server is taken in turn in order of descending linkage within the group of local servers and for each such server:

(i) a respective workgroup is created therefor unless the local server concerned has already been allocated to another workgroup created in respect of a said local server higher in said order, (ii) if a said respective workgroup has been created in (i) for the local server concerned, then the server is allocated to that workgroup, and (iii) any node whose linkage to the local server is substantially at least half of the total linkage of that node is allocated to the same workgroup as the local server.

It will be appreciated that a workgroup may contain more than one local server in the case where one such server is a well-linked client of another such server.

Using the workgroups established in this way, a determination can then be made as to whether it is worthwhile splitting a sub-network into two sub-networks, this determination involving:

(a) pruning the or each workgroup that has been created in respect of a local server located on the sub-network of interest, by removing from the workgroup any nodes that may no longer be appropriate to include therein when considering the workgroup only in relation to the sub-network of interest;

(b) forming a respective further workgroup for each node of the sub-network of interest where that node is not already in a workgroup associated with the sub-network;

(c) merging the workgroups associated with the sub-network of interest until only two such workgroups remain; and (d) deciding whether it is worthwhile splitting the sub-network by comparing the amount of traffic between the two workgroups left remaining after step (c) with the total traffic associated with each such workgroup.

The analysis tasks carried out following identification of the local servers are, of course, preferably carried out using the traffic data collected in step (1) of the main method but with all global server traffic removed. However, even if the global server traffic is not all removed, the analysis tasks will generally still produce some useful information.

According to another aspect of the present invention, there is provided a network analysis method for use in relation to a network of the type comprising a plurality of sub-networks each with a plurality of nodes, the method comprising the steps of:

(1) monitoring the network to collect and store traffic data indicative of the linkage between nodes as judged by traffic therebetween;

(2) processing the traffic data to identity nodes acting as local servers; and (3) determining for at least one of the local servers identified in step (2), the optimum sub-network for this local server, this determination involving notionally locating the local server concerned on each sub-network in turn and evaluating for each such location of the local server, a predetermined optimal-location function that provides a measure of the traffic between sub-networks that would be associated with the local server in its current notional location, said determination further including identifying as said optimum sub-network, that sub-network for which evaluation of said function indicates a minimum for said traffic between sub-networks.

According to a further aspect of the present invention, there is provided a network analysis method for use in relation to a network having a logical segment with a plurality of nodes, for the purpose of determining whether it is worthwhile splitting the logical segment into two such segments, the method comprising the steps of:

(1) monitoring the logical segment to collect and store traffic data indicative of the linkage between the nodes of the segment as judged by traffic therebetween;

(2) carrying out a first iterative process for analyzing the segment traffic data to classify said nodes into workgroups each with a local server and one or more client nodes, each iteration of this first iterative process involving allocating the node with the greatest traffic linkage to a respective new workgroup as a local server, further allocating as client nodes to the same workgroup those nodes whose linkage to the local server node is greater than a predetermined portion of the total linkage of the node concerned, and modifying the traffic data by removal of traffic associated with the new workgroup;

(3) carrying out a second iterative process for merging the workgroups identified in step (2) to leave two remaining workgroups, each iteration of this second iterative process involving identifying the workgroup with the smallest amount of associated traffic and merging it with the workgroup with which it has the greatest linkage; and (4) deciding whether it is worthwhile splitting the logical segment by comparing the amount of traffic between the two workgroups left remaining after step (3) with the total traffic associated with each such workgroup.

BRIEF DESCRIPTION OF THE DRAWINGS

A network analysis method according to the invention will now be described, by way of non-limiting example, with reference to the accompanying diagrammatic drawings, in which:

FIG. 3 is a diagram illustrating the main program items and data structures used in the network analysis method;

FIG. 4A shows a second form of traffic element data structure;

FIG. 9 is a flow chart of a Move-Suggestions program shown in FIG. 3;

FIG. 11 is a flow chart of a Place-Client program item used by the FIG. 9 Move-Suggestions program;

BEST MODE OF CARRYING OUT THE INVENTION

Figure 1:
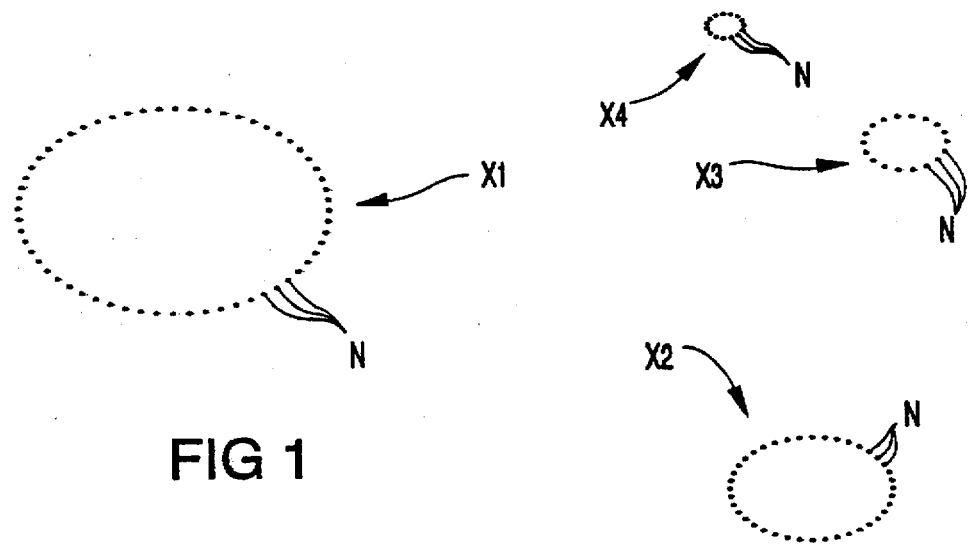
FIG. 1 is a node cluster diagram depicting an example network with four sub-networks.

FIG. 1 depicts an example network comprising four logical segments (sub-networks) X1, X2, X3 and X4 each with a plurality of nodes N, the nodes associated with a particular logical segment being clustered together. The logical segments are inter-connected by spanning devices in the form of bridges operating at level two of the seven-layer OSI Reference Model; each bridge makes its appearance on the FIG. 1 cluster diagram in the form of a corresponding node in each of the two logical segments it inter-connects. The pattern of interconnection of the logical segments by the bridges is not of importance for the purposes of the present description. The example network of FIG. 1 may be constituted by bridged Ethernets with each node being identified by an Ethernet address valid across all the logical segments of the network. The nodes N source and sink traffic to/from each other, this traffic being in the form of discrete message packets carrying both source and destination node addresses as well as the data to be transmitted.

The FIG. 1 network will be used as the basis for example traffic distribution diagrams used hereinafter to facilitate the description of the network analysis methods of the invention. For the purposes of the following description, it is assumed that the topology of the network in terms of which nodes are associated with which logical segments, is already known.

Figure 2:
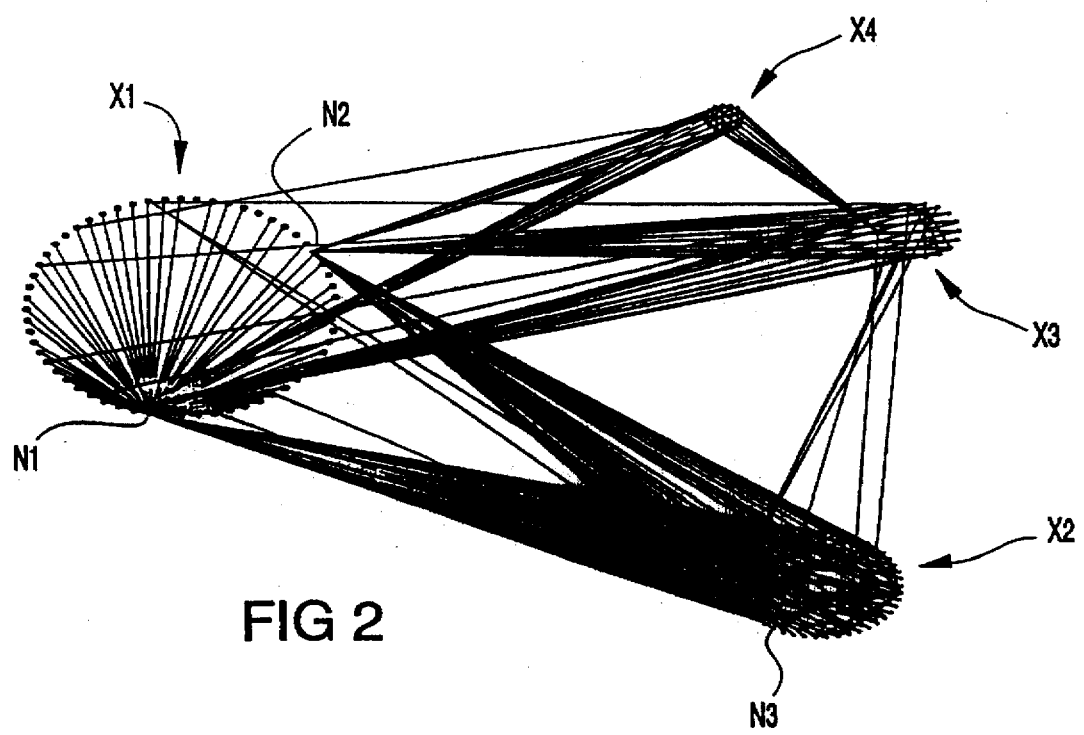
FIG. 2 is a diagram similar to FIG. 1 but showing example total traffic between nodes of the FIG. 1 network for a given monitoring period.

FIG. 2 illustrates the traffic across the FIG. 1 network over a given period of time, the passing of message packets between two nodes being represented by a line drawn therebetween with the thickness of the line providing a coarse indication of the quantity of traffic. In the present example, the traffic flows are derived by examination of the layer 2 source and destination addresses associated with each packet. Because the layer 2 addresses are valid across the whole network, examining the layer 2 addresses gives the true source and destination nodes of a packet regardless of the path taken across the network by the message packet.

Despite the lack of clarity in FIG. 2 resulting from the crowding together of traffic lines, it is possible to see that certain nodes communicate heavily with the other nodes of the network. For example, nodes N1 and N2 on logical segment X1 appear to communicate with virtually all other nodes of the network from which it might be reasonably inferred that these nodes have some overall role in monitoring or controlling the network.

Whilst diagrams of the FIG. 2 form give a network operator a general feel as to what is happening on the network, they do not permit a detailed scrutiny of the behaviour of the network and are easy to misconstrue.

The network analysis methods to be described hereinafter analyze traffic data similar to that used to create diagrams of the FIG. 2 form with a view to providing useful information on the character of the network and how its performance may be improved.

The general philosophy behind the network analysis methods to be described is that major improvements in the network's performance generally will not come from repositioning nodes that have a global pattern of communication (that is, their communication is not primarily with one logical segment) but from modifying the network in relation to nodes that communicate primarily with one logical segment (though not necessarily the segment upon which the node itself is located).

An important analysis task is therefore to separate out those nodes which communicate primarily on a global basis ("global servers") from those nodes who communicate primarily with one segment only and are major communicators in relation to that segment ("local servers"). It will be appreciated that whilst there may be many nodes which primarily communicate only with one segment, only some of these nodes will have a server-like role. Upon the local servers being identified, the network analysis methods described herein are then used to make suggestions as to whether any of these local servers should be moved to another logical segment and as to whether it would be worthwhile splitting a segment between two associated local servers.

FIG. 3 illustrates the main program items and the main data structures used in the implementation of the present invention described hereinafter. More particularly, three main program components are provided, these being an Extract-Servers program 10, a Move-Suggestions program 1, and a Split-Suggestions programs 12.

The Extract-Servers program 10 has available to it both traffic data and data on the logical arrangement of the network. The traffic data is in the form of a set of traffic elements 22 characterising node-to-node traffic on the network over a particular period. The data on the logical arrangement of the network is in the form of a list of segments 20 and a list of nodes 21, each list including association information between segments and nodes. The Extract-Servers program 10 analyses the traffic data presented in traffic elements 22 to produce a global servers list 23 and a local servers list 24.

The Move-Suggestions program 11 includes program items Place-Server 13 and Place-Client 14. The Move-Suggestions program 11 looks in turn at each local server identified by program 10 to decide whether it would be beneficial to move the local server to another segment and, if so, whether there would also be benefit in moving any of its client nodes (that is, nodes with which it communicates) to the same segment. On the basis of this analysis, program 11 produces a list of move suggestions (node-moves list 25). The program 11 also produces a list of work groups (workgroups list 26), each work group comprising a local server and its closely linked client nodes, if any.

The Split-Suggestions program 12 includes program elements Prune-Workgroup 15, Merge-Workgroup 16, and Split-Decision 17. The program 12 looks at each logical segment of the network in turn and groups all nodes into two work groups using as a basis the work groups listed in the workgroups list 26. The program 12 then makes a decision whether it would be worthwhile splitting the segment between two work groups and if it decides that there would be benefit in doing this, it enters a split suggestion in a segment-splits list 27.

As will become clear hereinafter, the level of sophistication of the programs 10, 11 and 12 (and, in particular, of program 10 in identifying global and local servers) depends on the depth of detail provided by the traffic data (elements 22). Thus, the traffic data may simply be based on level-2 packet information, that is, on the source and destination node addresses of message packets passed across the network with no attempt being made to look at higher level structuring contained in the data part of the packets. Alternatively, the traffic data may take account of such higher level structuring with a view to providing an indication as to whether packets passing to and from a particular node do so with the node acting in a server role or in a client role. In the absence of this more detailed form of traffic data, the Extract-Servers program 10 must make its judgement about which nodes are servers, simply on the basis of traffic-linkage magnitudes.

Whatever level of traffic data is required, appropriate network monitoring systems will be apparent to persons skilled in the art. One such system is, for example, described in our European Patent specification EP-A-0 480 555 which is based on randomly sampling packets (it will be appreciated that certain details regarding how much data is captured on each sampled packet may need to be varied from those described in that specification but such variation will be a matter of routine to persons skilled in the art). Other monitoring systems, including those that record every packet received at the monitoring points, can also be used.

For clarity of explanation, the operation of the programs 10, 11 and 12 will first be described for the case where the traffic data is based on the level-2 packet information without recourse to examination of higher-level structuring of the message data. The refinements possible with higher-level structuring information will then be discussed.

Figure 4A:
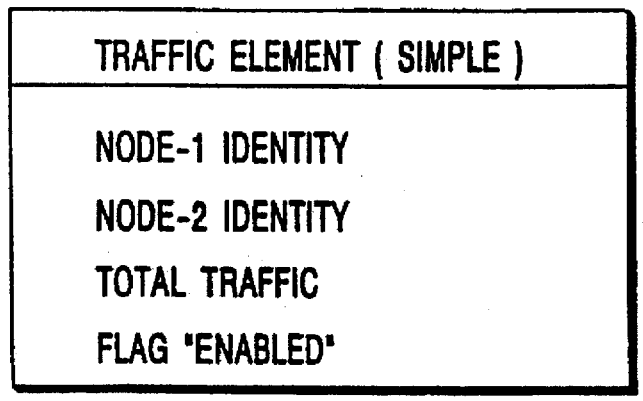
FIG. 4A shows a first form of traffic element data structure.

As already indicated, the traffic data analyzed by the programs 10, 11, 12 comprises a set of traffic elements 22. FIG. 4A shows the structure of a traffic element 22 for the case where the traffic data is based on level 2 packet information only. As can be seen, each traffic element comprises four fields, namely a node-1 identity field, a node-2 identity field, a total traffic field, and an "Enable" flag field. Where traffic elements 22 have the FIG. 4A form, then there is a respective traffic element 22 for each pair of communicating nodes in the network, the identity of the nodes involved being recorded in the node-1 and node-2 identity fields. Each such traffic element 22 is used to record the total traffic (for example, in tens of the number of packets and/or the number of bytes) passed between the nodes concerned in both directions.

The Enable flag field of each FIG. 4A traffic element 22 permits that elements to be marked for inclusion or exclusion from the traffic data being considered at any particular time by the programs 10, 11, 12. By convention, when an element 22 has its Enable flag set, it is included in the currently-relevant traffic data, whilst when the flag is reset, the element is excluded. Initially (at the start of program 10) the Enable Flags of all traffic elements making up the traffic data, are in a set state.

Figure 5:
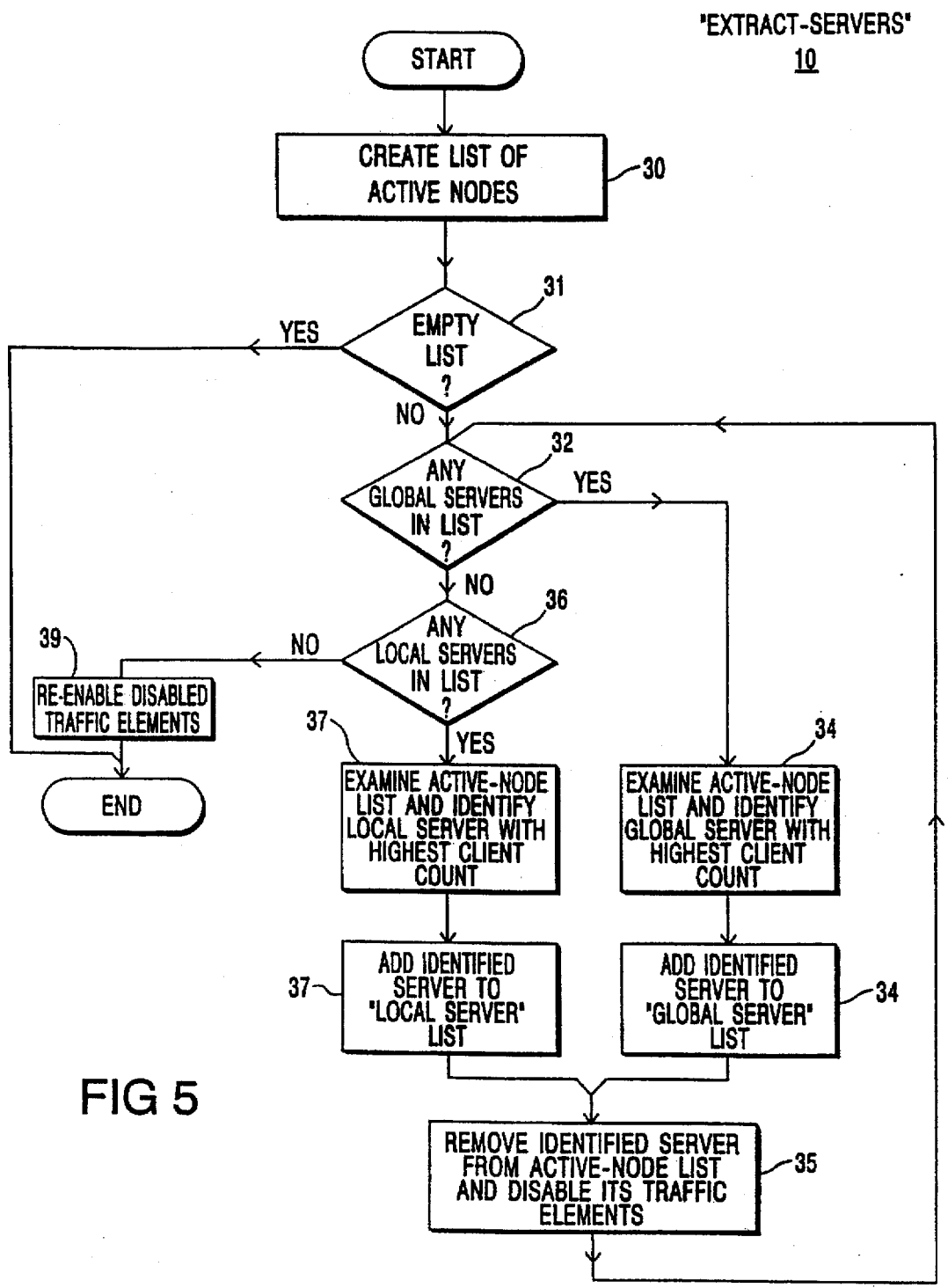
FIG. 5 is a flow chart of an Extract-Servers program shown in FIG. 3.

Turning now to the consideration of the Extract Servers program 10, this program is shown in flowchart form in FIG. 5 and comprises steps 30 to 39. On starting, program 10 examines the traffic data represented by the traffic elements 22 and creates a list of all active nodes (step 30) that is, nodes transmitting or receiving traffic. If, in fact, there are no active nodes (tested in step 31) then the program 10 terminates immediately. However, if as will generally be the case, the traffic data shows that there are active nodes, the program 10 then proceeds to step 32 in which it looks for the presence of nodes in the list of active nodes that are acting as global servers.

In this context, by "global server" is meant a node whose traffic linkage with any of the logical segments X1–X4 of the network is less than a predetermined proportion of the total linkage of that node with all segments. Generally this predetermined proportion will be 50% or thereabouts. In other words a global server is a node with no predominate linkage to any particular logical segment of the network. The measure of traffic linkage used in making the assessment as to whether a node is a global server is preferably simply a count of the number of peer nodes—that is, the number of nodes with which the node of interest communicates; however, it would also be possible to base the measure on the traffic volume in terms of packets, frames or bytes exchanged with each logical segment provided the total traffic field of each traffic element 22 records the appropriate information.

Figure 6:
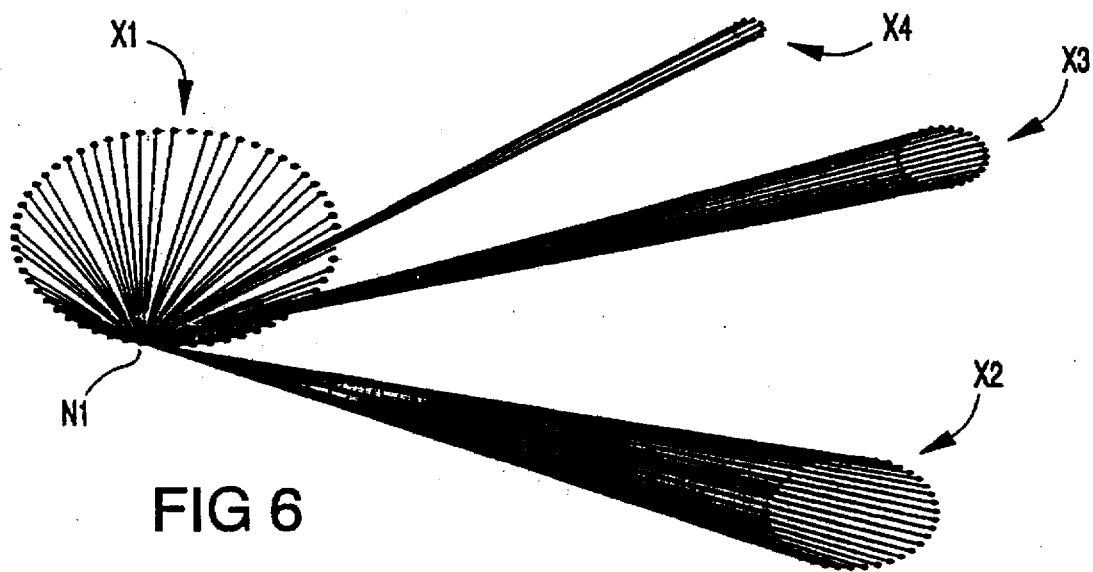
FIG. 6 is a diagram similar to FIG. 2 but showing only that component of the total traffic involving a node N1.

FIG. 6 illustrates the network traffic due to a global server node N1 in logical segment X1. As can be seen, the node N1 communicates with substantially all other nodes with the result that its communication with any one of the logical segments X1 to X4 is less than 50% of its communication with all the segments taken together.

Assuming that at least one global server is found in the active node list in step 32, the program 10 next executes step 33 in which it identifies the global server in the active node list that has the highest total traffic linkage (again preferably measured in terms of peer node count, though if two global servers have the same peer node count, resort can then be had to looking at total traffic volumes). Once step 33 has identified the most active global server, the identity of this server is added to the global-server list 23 (step 34).

The program 10 next proceeds to step 35 in which the server just identified is removed from the active node list and its associated traffic elements 22 are disabled by resetting of the Enable flag in each of these elements.

Figure 7:
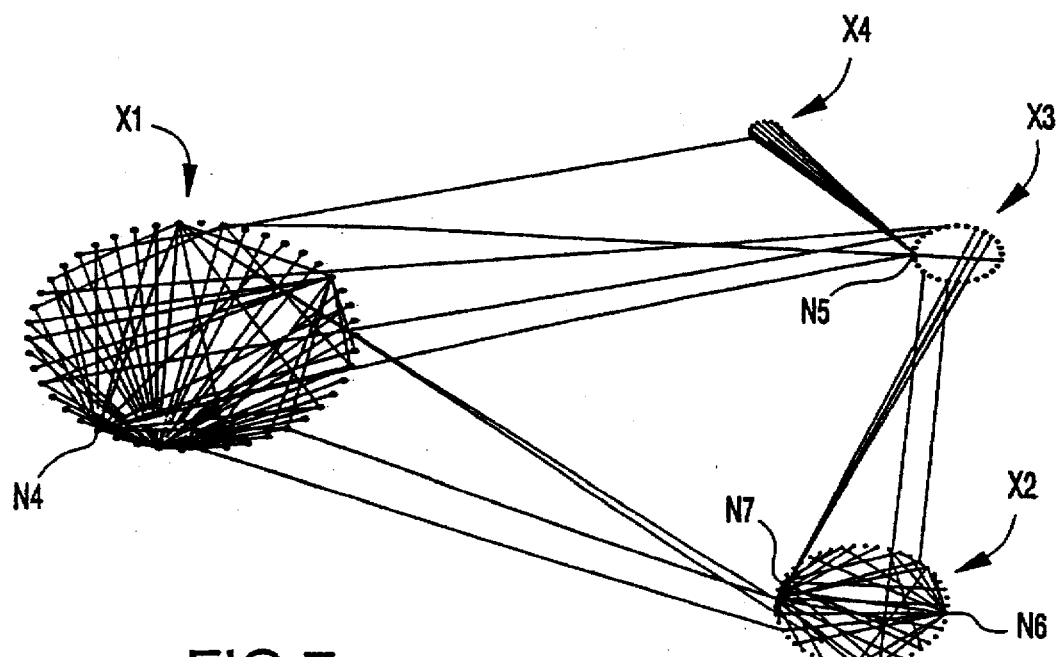
FIG. 7 is a diagram similar to FIG. 2 but showing only those components of the total traffic that remain after removal of traffic associated with global servers as identified by the FIG. 5 Extract-Servers program.

The program now returns to step 32 and on the basis of the modified traffic data (that is, the traffic data with certain of the elements 22 disabled) it tests again to see whether there are any global servers present in the active node list; if so, steps 33 to 35 are repeated. This process continues until no global servers are identified in the active node list by the test of step 32. For the example traffic of FIG. 2, three iterations of steps 33 to 35 will occur before no further global servers are found. The first iteration identifies node N1 as a global server, the second iteration identifies node N2 as a global server, and the third iteration identifies N3 as a global server. With the traffic elements of these global servers disabled, the remaining elements represent a traffic distribution as shown in FIG. 7.

When step 32 fails to identify a global server, then step 36 is carried out to test for the presence of any local servers in the active node list. In this context, a "local server" is a node whose traffic linkage with the logical segment with which it is most linked, is greater than a predetermined proportion (generally 50% or thereabouts) of its total linkage with all segments. Thus, for example, nodes N4, N5, N6 and N7 of FIG. 7 are acting as local servers for the traffic under consideration (indeed, there are a number of other nodes acting as local servers in FIG. 7 but these have not been referenced for clarity). It will be appreciated that the measure of traffic linkage used in testing for a local server can, as with the global server test, be simply a count of peer nodes or may be a measure of actual traffic volume. It will also be appreciated that the traffic linkage measures are effected on the basis of the traffic data as modified by the disabling of traffic elements by step 35.

Assuming that at least one local server is identified in the active node list, the program 10 then proceeds to step 37 in which it identifies the local server with the highest traffic linkage (preferably measured as a count of the total number of peer nodes with any fie being resolved by reference to traffic volumes). Once the local server with the highest traffic linkage has been identified, the identity of this server is added to the local servers list 24 (step 38). Step 35 is then executed to remove the identified server from the active nodes list and to disable its associated traffic elements 22.

Thereafter, program 10 loops back to step 32 to test again for the presence of any global server in the active node list (it being appreciated that the disabling of the traffic elements associated with the just-identified local server may have resulted in the emergence of a new global server in the active node list though this is not the case for the present example traffic).

The identification of global and local servers continues in this manner with the preferential identification of global servers, until no more global or local servers are found. This will result in the program exiting from step 36 to step 39 in which it re-enables all the traffic elements 22 disabled during the running of the program 10. Program 10 then terminates.

Figure 8:
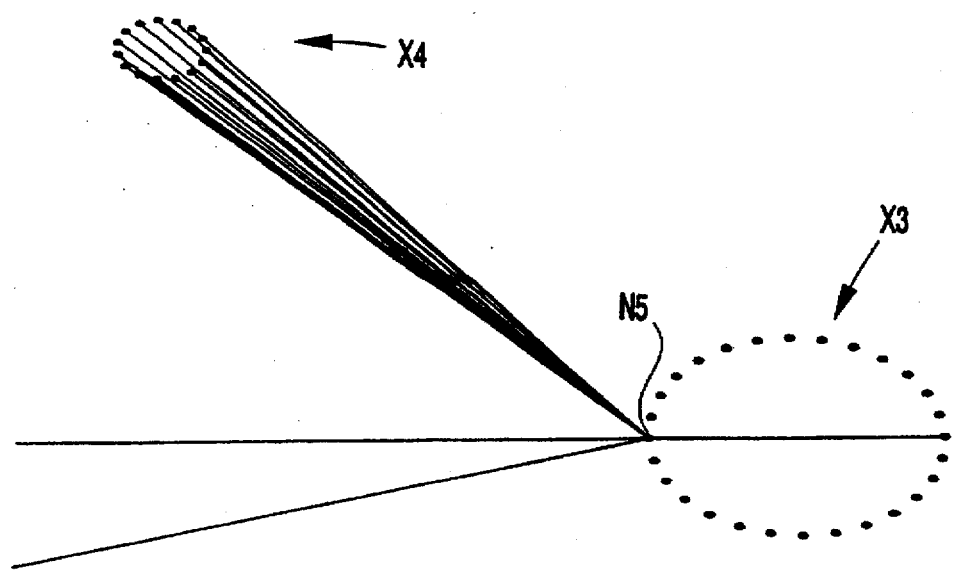
FIG. 8 is a diagram similar to FIG. 2 but showing only part of the network and only that component of the total traffic that is associated with a local server node N5 as identified by the FIG. 5 Extract-Server program.

Once the Extract-Servers program 10 has identified the local servers, the Move-Suggestions program 11 can be run to ascertain the optimum logical segment X1 to X4 for each local server and to suggest whether as a consequence any local server nodes should be moved together with any of their client nodes. A typical situation where a local server could usefully be moved is illustrated in FIG. 8 which shows the logical segments X3 and X4 and that component of the traffic illustrated in FIG. 7 that is associated with a local server node N5. From FIG. 8 it can be seen that node N5 communicates primarily with logical segment X4 even though local server node N5 is located on logical segment X3. Clearly it would be beneficial for the local server node N5 to be moved from the logical segment X3 to the logical segment X4. It is this type of situation that the Move-Suggestions program 11 is intended to identify.

FIG. 9 is a flowchart of the Move-Suggestions program 11. This program is intended to operate on the collected traffic data from which the traffic elements 22 associated with the identified global servers has been removed; accordingly, the first step 40 of the program 11 is to disable the traffic elements associated with the global servers. Thereafter program 11 enters a loop structure in which each local server is considered in turn taken in peer count size order (step 41), the exit test from this loop structure being in step 42 which tests to see if there is a local server left to be processed.

Each local server undergoes processing steps 44 to 48 in order to determine whether it should be moved to a different logical segment or whether any of its client nodes should be moved.

More particularly, in step 44 the Place-Server program item 30 is executed to determine if the local server being considered (the current "target" server) should be moved, any move-suggestion being placed in the node-moves list 25. The Place-Server program item 13 also notionally implements any suggested move for the target server so as to enable subsequent step 46 to check whether any of the client nodes of the target server should also be moved.

In step 45, a new work group data structure (hereinafter, simply "workgroup") is created for the target server if it has not previously been included, as a client node, in a workgroup created in an earlier iteration of the steps 44–48 in respect of a local server with a higher client node count. The workgroups are linked in a workgroups list 26. Each workgroup is considered to be associated with the logical segment on which the local server giving rise to its creation is located.

Next, in step 46 the Place-Client program item 46 is executed to ascertain whether any of the client nodes of the target server should be moved to the logical segment of the server (this being the segment on which the server is located after implementation of any move-suggestion provided by step 44). Any client move suggestion generated by the place-client program is stored in the node-moves list 25 with each suggestion being temporarily implemented. Furthermore, any client node which is well linked to the target server (that is, substantially at least half of that client's total linkage is with the target server) is placed in the same workgroup as the target server.

It will be appreciated that assessing whether a client node is well linked to its associated local server is carried out by looking at traffic volume measures rather than node counts.

After all the client nodes of the target server have been checked to see if they could be advantageously moved, any notional movement of the target server and its clients from their original segments are reversed (steps 47 and 48) by appropriate action in the relevant segment and node data structures 20 and 21.

Once all the local servers recorded in the local server list 24 have undergone processing in steps 44 to 48, the loop structure of the Move-Suggestions program item 11 is exited at step 42 and all the global-server traffic elements are re-enabled (step 49) before the program item 11 is terminated.

It should be noted that the reason why the local servers are processed by program item 11 in the order of their client count size, is to maximize as far as possible the association of the nodes into workgroups in step 45. More particularly, by processing the less-linked local servers later on, it is possible that they may have already been included within the workgroup of a more-linked local server. In this case, not only is the less-linked local server included in the same workgroup as the more-linked local server, but also any of the less-linked local server's client nodes that are well linked to the less-linked local server, will also be included in the workgroup of the more-linked local server.

Figure 10:
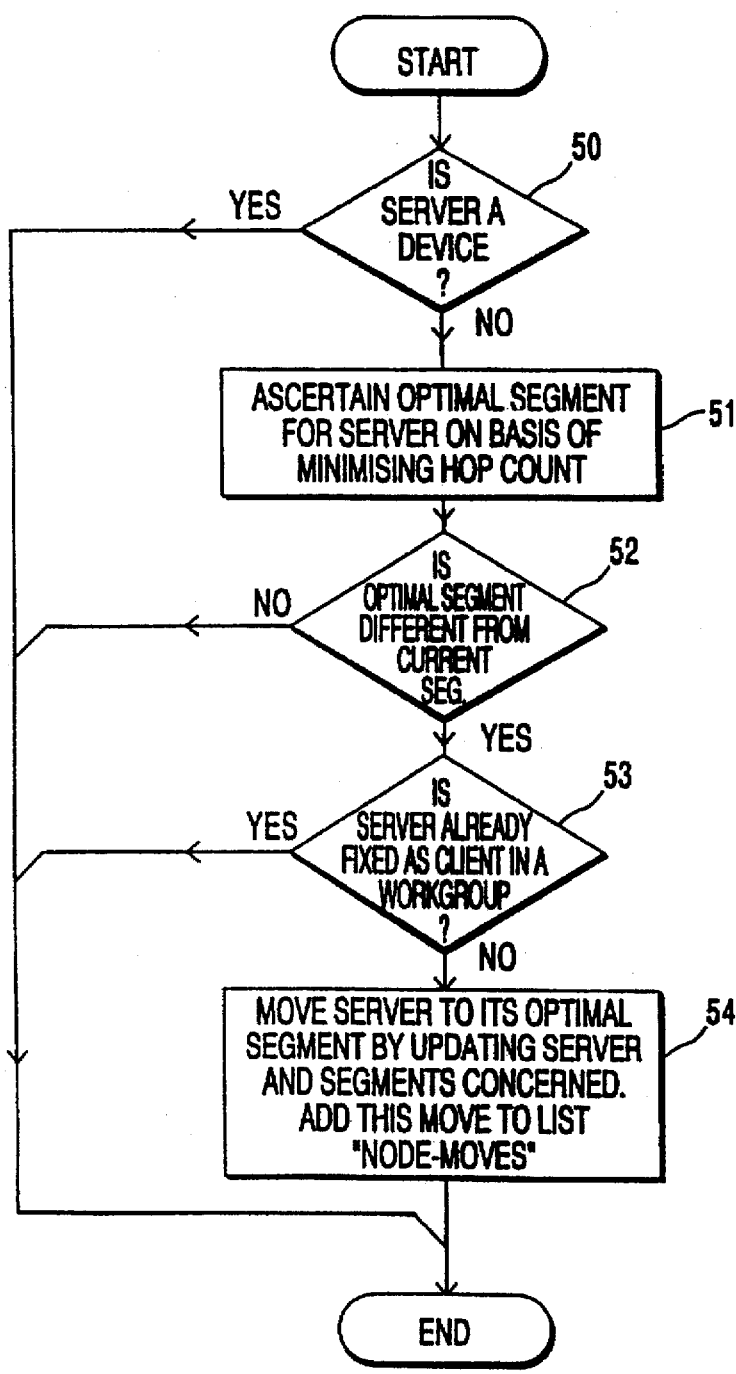
FIG. 10 is a flow chart of a Place-Server program item used by the FIG. 9 Move-Suggestions program.

FIG. 10 is a flowchart of the Place-Server program item 13 executed in step 44 of the Move-Suggestions program 11. The Place-Server program 13 is passed the identity of a particular target server and then proceeds to test whether it is worthwhile moving the server to a different segment. As a preliminary step, however, the program 13 first tests to see whether the server is, in fact, a spanning device (bridge/router/gateway) that cannot be readily moved and should be treated as fixed for the purposes of program 13 (see step 50). Indeed, step 50 can be generalised into a check of a list of nodes specified as being unmovable for one reason or another.

The Place-Server program 13 next proceeds to step 51 where is ascertains the optimal segment for the server under consideration. In the present example, this is done by looking for the minimum total hop count between the server and its client nodes working on the basis that a client on the same segment as the server scores a "zero" hop count whereas a client on a different segment scores a "one" hop count (regardless of how many segments may actually need to be hopped across on the physical network to pass a message from the server to that client). Thus, the server is notionally located on each logical segment in turn and the corresponding hop count value is calculated; the segment location producing the minimum hop count is then identified as the optimum segment for the server under consideration.

It will be appreciated that measures other than the simple hop count measurement described above can be used for determining the optimum segment. Suitable measures are those which are sensitive to the inter-segment component of the traffic between the target server and its clients for each location of the server. Thus, for example, another suitable measure would be the inter-segment traffic volume in packets/frames/bytes generated for each position of the server.

Once the optimal segment location for the target server has been determined, a check is made in step 52 as to whether this segment differs from the current segment of the target segment. If these segments are the same, program 13 terminates. Assuming, however, that the optimal segment does differ from the current segment for the server, step 53 is executed in which a check is made as to whether the target server is already fixed as a client node in a workgroup created in respect of an earlier-considered server. As already explained above, it is possible that a server may be well linked as a client to a more-linked server and therefore fixed in the workgroup of the latter; in this case, the less-linked server is considered to be immovable and the program 13 is terminated without a move suggestions being made for the server.

Provided the target server is not fixed as a client in the workgroup of another server, step 54 of the Place-Server program 13 is executed to add a move suggestion to the node-moves list 25; this suggestion identifies the server concerned, its current segment and the proposed new segment. The proposed move is also temporarily notionally executed by appropriate modification of the server and segment data structures to indicate that the server is now on the optimal segment just identified. Thereafter, program 13 terminates.

FIG. 11 is a flow chart of Place-Client program item 14 executed in step 46 of the Move-Suggestions program 11. The program 14 is executed for each client node of the target server which is under consideration during a current iteration of the Move-Suggestions program 11.

The first two steps 60 and 61 of program 14 respectively check to see if the client node under consideration is already fixed in a workgroup or whether it is a device (or is otherwise more generally immovable), in either of which cases the client node is considered immovable and the program 14 is terminated.

Provided, however, the client node under consideration is not immovable, a test is next carried out in step 62 to see if the client node is well linked to the server concerned. In this context, "well-linked" means that the linkage of the client node to the server is greater than 50% of the total linkage of the client's node (as measured by traffic volumes). It will be appreciated that some variation in the 50% figure is possible particularly in an upwards direction. If the client node is not well-linked to its server, then it is not considered appropriate for the client node to be moved to the same segment as the server and the program 14 is terminated. However, if the client node is well-linked to the server under consideration, the client node is added to the server's workgroup and the identity of the target is entered into the data structure of the client node identifying the server as the primary server for the client node (step 63). Thereafter, a check is made in step 64 as to whether the client's segment differs from the server's segment and if so, step 65 is executed to add a move suggestion into the node moves list 25 proposing that the client node be moved to the server's segment. Execution of step 65 also involves temporarily moving the client node to the server's segment by updating the client node and segment data structures concerned.

Having described the operation of the Move-Suggestions program 11 and its associated program item 13 and 14, consideration will now be given to the Splits-Suggestion program item 12 with its associated program items 15, 16 and 17.

Figure 12:
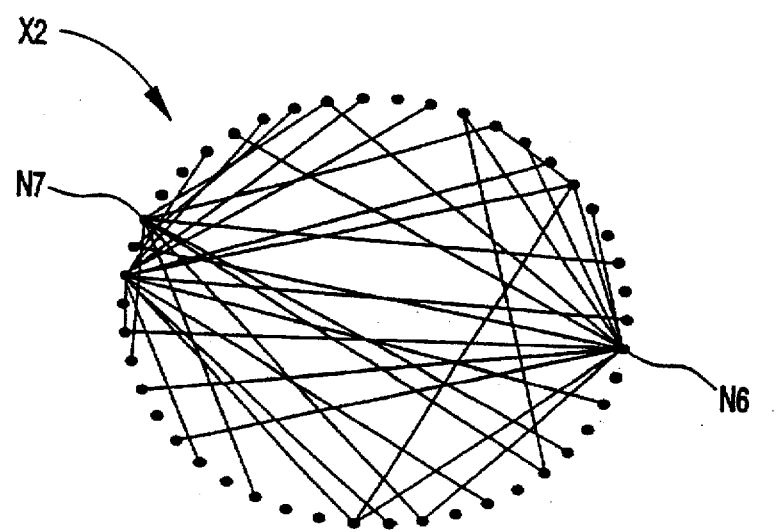
FIG. 12 is a diagram similar to FIG. 2 but showing only one sub-network and only those components of the total traffic that are local to the sub-network and are associated with local servers as identified by the FIG. 5 Extract-Server program.

The Split-Suggestions program 12 considers each logical segment in turn to decide whether it would be beneficial to split any of the segments into two. FIG. 12 illustrates a situation taken from the example traffic data where a logical segment, in this case segment X2, into two segments (here, in correspondence to groupings based around local server nodes N6 and N7).

The Split-Suggestion program 12 starts from the basis of the node groupings built up in the workgroups list 26 by the Move-Suggestions program 11. However, the workgroups recorded in the list 26 are not immediately usable to make a decision regarding segment splitting because each such workgroup may contain nodes from more than one segment and, additionally not all the network nodes are included in the workgroups (only those nodes which are well linked to server nodes have been included by the program 11).

Figure 13:
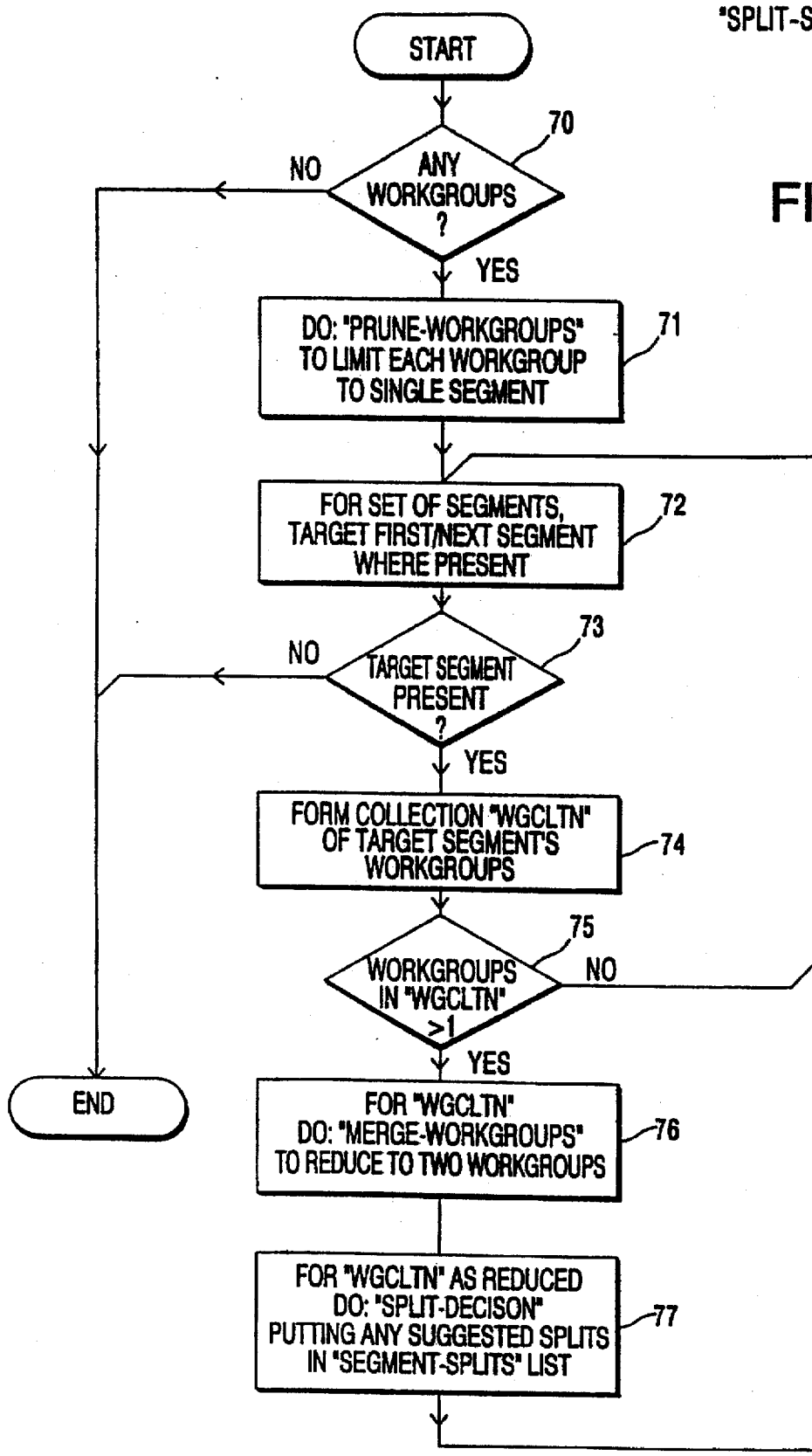
FIG. 13 is a flow chart of a Split-Suggestions program shown in FIG. 3.

With reference to FIG. 13, the first step 70 of the Split-Suggestion program 12 involves checking whether there are any workgroups in the workgroups list 26; if no such workgroups exist, then the program 12 is terminated without any segment split suggestions having been made. However, generally there will be several workgroups in the workgroups list 26 and, in this case, program 12 proceeds to step 71 in which the Prune-Workgroup program item 15 is executed. The purpose of the Prune-Workgroup program 15 is to prune each workgroup so that it relates to only one segment and only includes nodes on that segment whose linkage can be traced back through nodes on the segment to the server in respect of which the workgroup has been created in step 45 of program 11. More particularly, the program 15 will remove from the workgroup any node not on the same logical segment as the workgroup and also any node whose inclusion in the workgroup is either directly or indirectly a result of the original inclusion of a node not on the logical segment of the workgroup.

Once the workgroups have been pruned, a loop structure is entered which has a looping mechanism based on steps 72 and 73 for taking each segment in turn and carrying out processing steps 74 to 77. More particularly, in step 72, the first or next segment in the list of segments is targeted, step 73 checking that the end of the list has not been reached (if it has, program 12 is terminated).

For each logical segment, step 74 to 77 are executed. In step 74, a collection "WGCLTN" is formed of all the workgroups in list 26 that are relevant to the current target segment. Step 75 checks to see if there is more than one workgroup in the collection WGCLTN; if this is not the case, then it is assumed that it will not be worth splitting the logical segment and processing returns to the start off loop to take the next segment. Assuming, however, that there are at least two workgroups in WGCLTN, program 12 proceeds to step 76 in which the Merge-Workgroups program item 16 is executed resulting in all the nodes on the logical segment under consideration being allocated to workgroups and the number of workgroups reduced to only two.

Thereafter, step 77 executes the Split-Decision program item 17 to decide whether it is worthwhile splitting the logical segment under consideration in correspondence to the final two workgroups produced by step 76. Any positive split suggestion is entered into the segment-splits list 27, each entry identifying the segment concerned and the two groupings of nodes into which it is suggested the segment be split.

Figure 14:
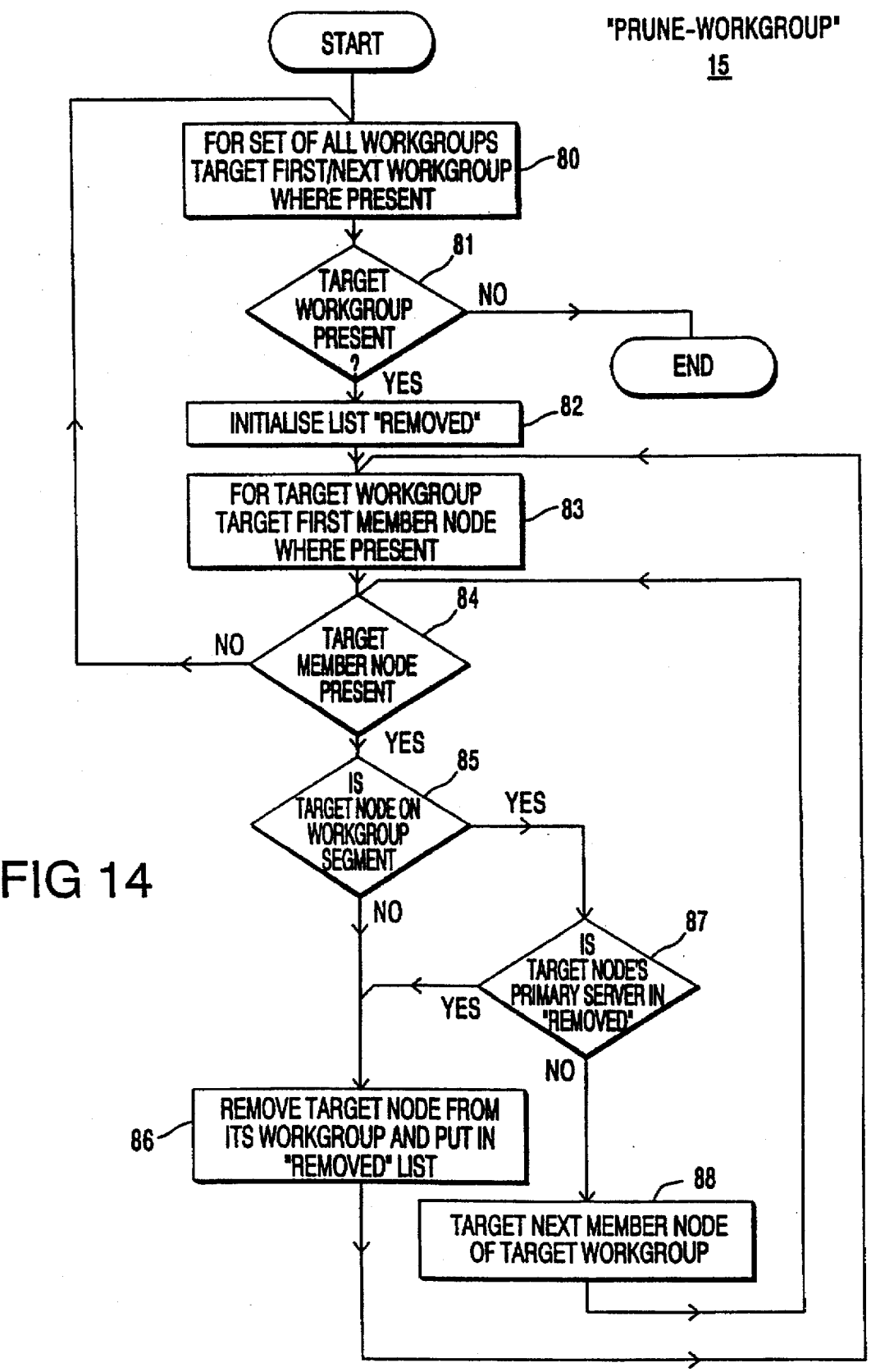
FIG. 14 is a flow chart of a Prune-Workgroups program item used by the FIG. 13 Split-Suggestions program.

FIG. 14 is a flow chart of the Prune-Workgroups program item 15. This program 15 basically has a double loop structure by which processing steps 85 to 87 are applied to each member node of each workgroup in the workgroups list 26. More particularly, steps 80 and 81 are loop control steps causing the program 15 to examine each workgroup in list 26 in turn until all workgroups have been looked at. For each new workgroup examined, a list "Removed" is initialised in step 82. Thereafter, an inner loop structure is entered in which each node of the current workgroup is considered in turn; however, progress down through the constituent nodes of a workgroup depends on whether or not a processing step 86 is executed in respect of a node—if it is, then that node is removed from the workgroup and put in the Removed list and processing of the workgroup nodes starts again from scratch. In contrast, if the step 86 is not carried out in respect of a particular node then progress down the nodes of the workgroup under consideration continues.

More particularly, after the list Removed has been initialised in step 82, step 83 takes the first member node of the target workgroup with step 84 checking that there is such a node (if there is not, this indicates that all nodes in a workgroup has been processed and processing returns to step 80 to pick up a new workgroup). Step 85 is then executed in respect of the first node, this step being simply a test as to whether the node concerned is on the same segment as the workgroup. If the target node is not on the same segment as a workgroup, then step 86 is executed to remove the target node from the workgroup and put in the Removed list; thereafter, processing returns to step 85—that is, the same workgroup is taken again and its new first node found. On the other hand, if in step 85 it is found that the target node is on the same segment as the workgroup, step 87 is executed to ascertain whether the primary server of the target node is in the Removed list—this, of course, will not be the case in respect of the first node examined for a workgroup. A negative result in step 87 results in execution of step 88 to advance the target node to the next node in the workgroup and to return processing to step 84. Processing continues in this manner with nodes being pruned from the current workgroup in step 86 if they either do not reside on the same segment as the workgroup (as tested for in step 85) or the primary server of the node concerned is in the Removed list (as tested for in step 87). When any node is pruned, processing of the nodes of the workgroup is re-initiated.

Figure 15:
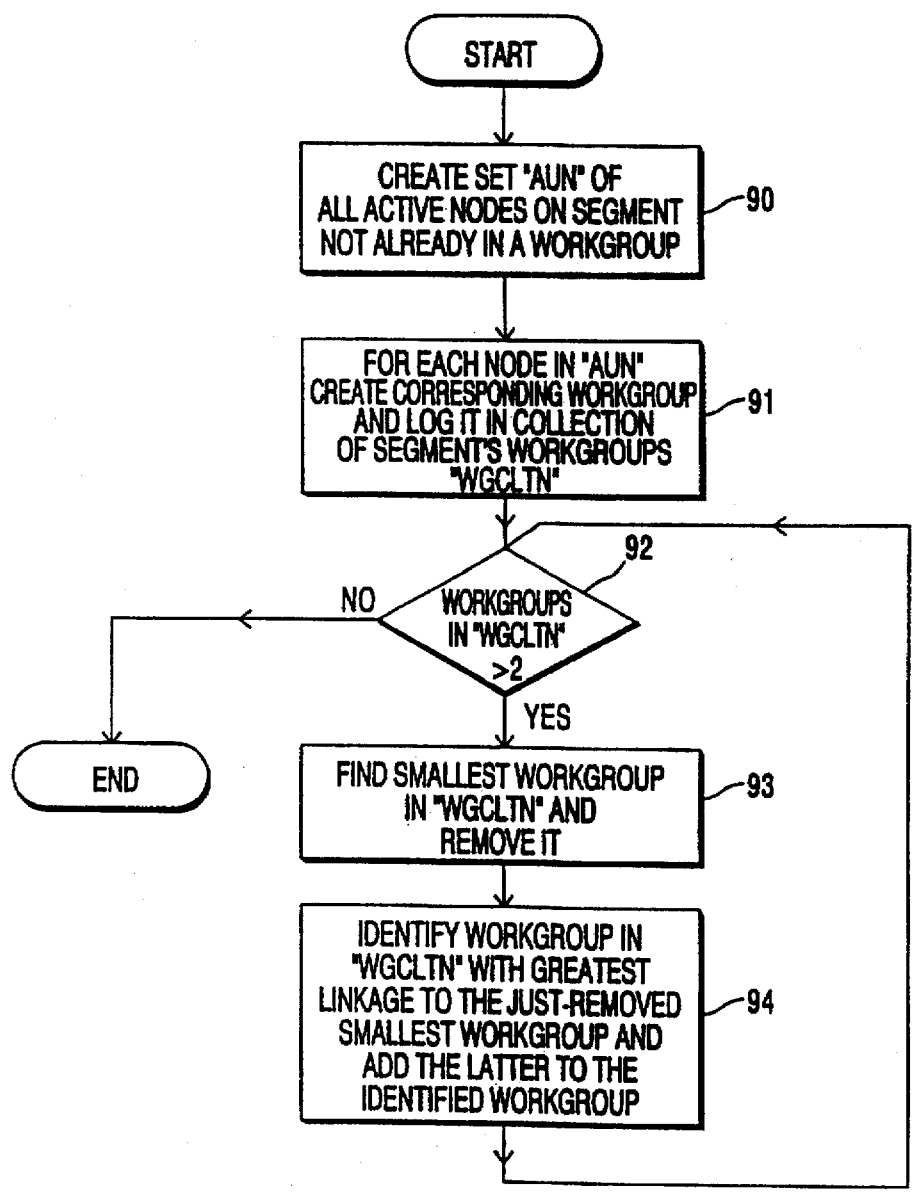
FIG. 15 is a flow chart of a Merge-Workgroups program item used by the FIG. 13 Split-Suggestions program.

FIG. 15 is a flowchart of the Merge-Workgroups program item 16 carried out in step 26 of the Split-Suggestions program 12. On start up of this program item, many of the nodes of the segment concerned may not have been allocated to the workgroups relevant to the segment. The first step 90 of the program 16 is therefore to create a set "AUN" of all active unallocated nodes on the segment of interest, that is, nodes with associated traffic that are not already in a workgroup of the segment.

Once the list AUN has been created, program 16 proceeds to step 91 in which it creates a respective new workgroup for every node in AUN, each such workgroup being logged in the collection WGCLTN of workgroups for the segment concerned.

An iterative process is then carried out to reduce the number of workgroups in collection WGCLTN to two, step 92 being a test for this condition. The process of reducing the number of workgroups to two is effected by merging workgroups together. Thus, in step 93 the smallest workgroup in WGCLTN is identified either in terms of the number of nodes concerned or the traffic volume flowing between these nodes. Once identified this smallest workgroup is removed from the collection WGCLTN and is added into the workgroup in WGCLTN with which it has the greatest linkage (in terms of nodes or traffic volume), this addition being carried out in step 94.

Once the number of workgroups in WGCLTN has been reduced to two, the Merge-Workgroups program 16 is exited.

Figure 16:
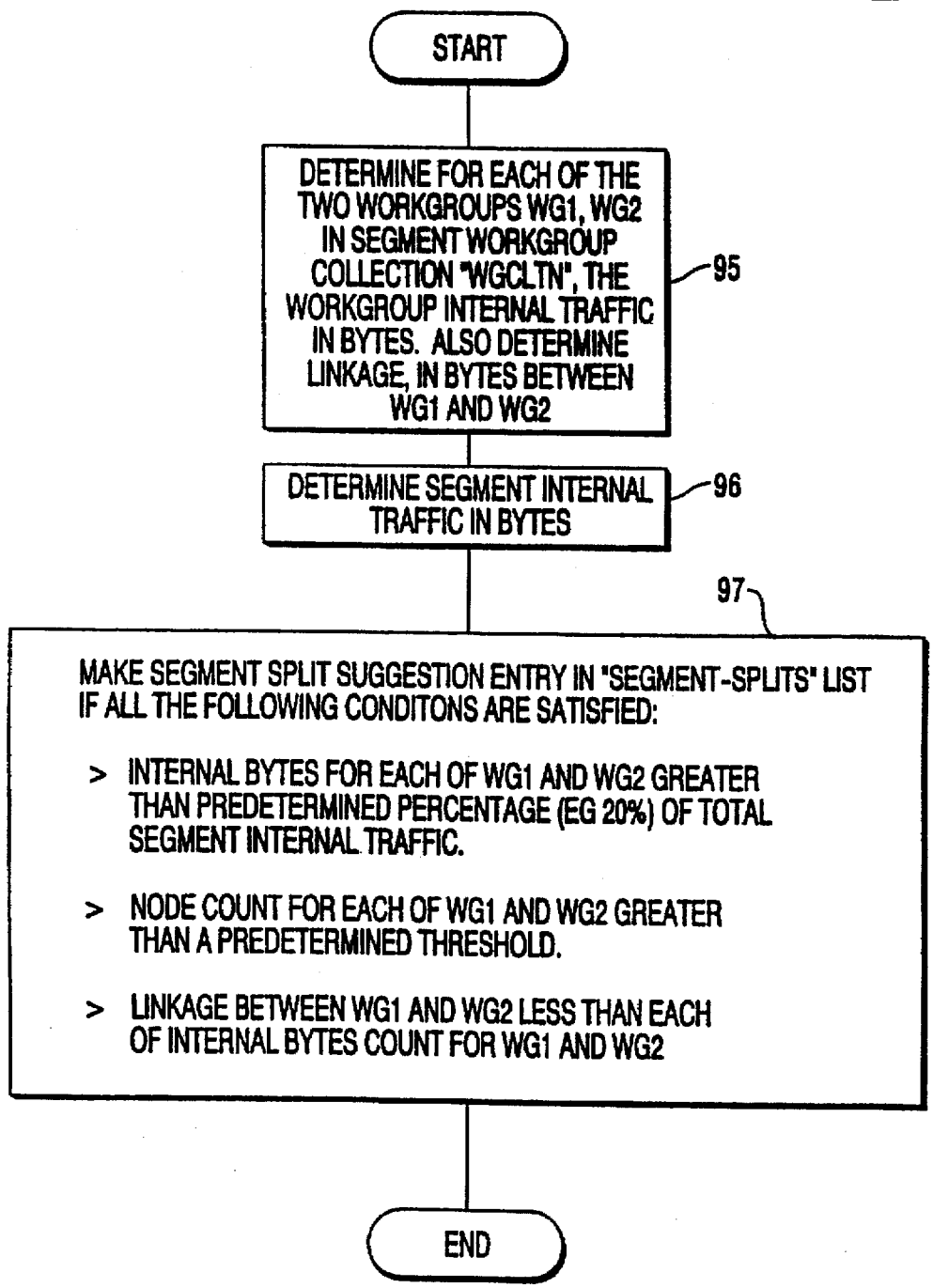
FIG. 16 is a flow chart of a Split-Decision program item used by the FIG. 13 Split-Suggestions program.

FIG. 16 is a flowchart of the Split-Decision program item 17 carried out in step 77 of the Split-Suggestions program 12. Program 17 makes a decision as to whether a logical segment should be split into two such segments in correspondence with the two remaining workgroups in the WGCLTN list for the segment concerned. This decision is made on the basis of traffic flows within and between the two workgroups (for convenience these workgroups are referenced WG1 and WG2). In the FIG. 16 flowchart it is assumed that traffic flows is evaluated in bytes but this will, of course, depend on the traffic measure unit used in the traffic measure collected in the total traffic field of the traffic elements 22.

In step 95 of program 17 the internal traffic of each workgroup WG1 and WG2 is determined, this internal traffic being the total traffic between nodes within each workgroup. Also in step 95 a determination is made of the linkage between workgroups WG1 and WG2. As already indicated the internal traffic measures and the workgroup linkage are all determined in terms of bytes in the FIG. 16 flowchart.

Next, step 96 is executed to determine the total internal traffic for the segment concerned, again in bytes.

On the basis of the foregoing measures, step 97 is then executed to determine whether it is worthwhile splitting the segment concerned into two. The criteria used for this decision are practical ones and may vary depending on the circumstances. However, basically it will only be worthwhile splitting a logical segment if the total linkage between the two workgroups WG1 and WG2 is not too large. There will also be little point in splitting a segment if one or both of the workgroups only represents a small amount of the total traffic for the segment or if the number of nodes in either of the workgroups is small. Step 97 particularizes the foregoing by carrying out three tests and Only recommending a split of the segment if all three tests are passed; these three tests are as follows:

a test that the internal traffic, in bytes, for each of the workgroups WG1 and WG2 is greater than a predetermined percentage (for example, 20%) of the total segment internal traffic;

a test that the number of nodes in each of the workgroups WG1 and WG2 is greater than a predetermined threshold (for example, 4);

a test as to whether the linkage between WG1 and WG2 is less than the internal traffic for each of WG1 and WG2.

As mentioned at the outset, the above description of an implementation of the network analysis method of the invention is for the case where the traffic data contains no indication of the server/client role of a node sending/ receiving data. Such information may, however, be available; thus, for example, for messages being sent under the TCP protocol, each message will include a source node port number and a destination node port number. Certain port numbers are preassigned for the more common services. Port numbers preassigned in this manner are known as "well-known ports". For example, a machine providing a host name server service will do so on a well-known port with a port number of 42; similarly, a X.400 mail service will be provided on a well-known port number 103.

Generally when one node is using an end point which is not a well known port and it is communicating with a well known port of another node, that latter node will be acting as a server whilst the first mentioned node will be acting as a client. Checking the port numbers of the source and destination nodes therefore permits an assessment to be made as to the respective roles being performed by the nodes.

It does, however, often occur that two nodes will communicate with each other both through well-known ports. In this case, either no judgement can be made as to which node is acting as a server and which is a client, or recourse must be had to some prioritizing of well-known port numbers in order to make a judgement as to the roles of the nodes concerned. Of course, if neither node is using a well-known port, then looking at the port numbers does not assist in determining the roles of the nodes concerned.

Figure 4B:
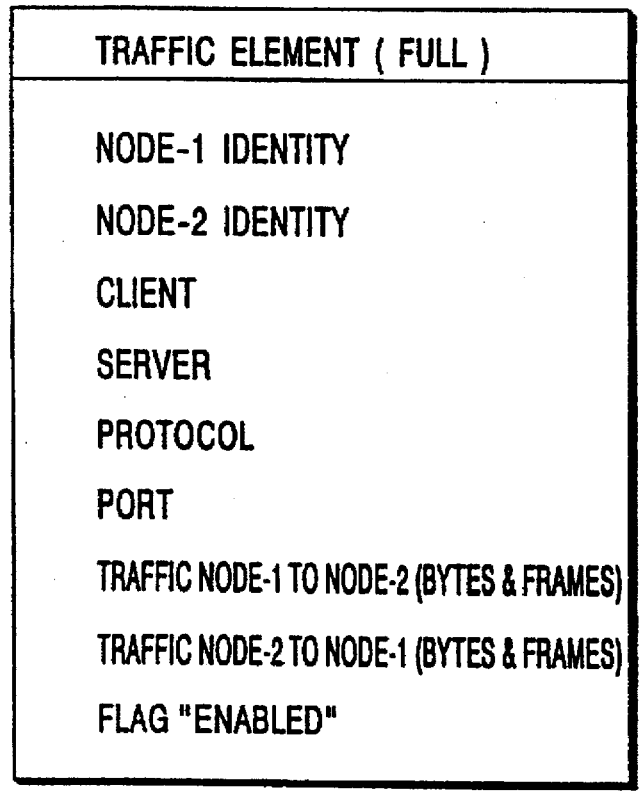

FIG. 4B illustrates a form of traffic element data structure suitable for use in the case where well-known port numbers are used to identify node roles. The first two fields of the FIG. 4 data structure contain the identifies of the communicating node pair. The third and fourth fields are used to specify which of the identified nodes is acting as a client and which as a server (where such information has been derived). The fifth field identifies the protocol under consideration—in this respect, well-known port usage is not restricted to the TCP protocol and identical or similar mechanisms are operated in other protocols. The sixth field of the FIG. 4B data structure is used to hold the port number for the node identified as acting as a server; this port number will, of course, be a well-known port number. The seventh and eighth fields contain traffic volume data in the two directions of traffic flow between the pair of nodes concerned. The final field is the Enabled Flag field already described above in relation to the FIG. 4A data structure.

It will be appreciated that whilst it was only necessary to provide one traffic element for each pairing of nodes in the case where no role information is being collected, where such information is derived from the traffic, then at least three traffic elements will be needed in respect of each node pairing, one element to record traffic in respect to a first one of the nodes acting as a server, a second element to record traffic in respect of other node acting as a server, and a third element to record traffic in respect of which no assignment as to role could be made. In fact, it may be convenient to provide a respective traffic element for each combination of a well-known port at one node communicating with a not well-known port at the other node.

The node role information collected in the above manner is particularly useful in identifying the global and local servers, this being the operation carried out by the Extract-Server program 10. In the execution of this latter program, the assessments as to whether a node is a global or local server are based on its traffic linkage when acting in a server role as opposed to a client role, such a distinction now being possible through the use of multiple traffic elements for each node pairing. More particularly, in assessing whether a node is acting as a server, reference will be had to the traffic elements for which that node is identified as a server; in fact, reference will generally also be had to those traffic elements where the role of the node concerned is undefined (in other words, the only traffic elements ignored are those for which the node concerned is identified as a client). The inclusion of the traffic for which a server has no identified role is consistent with the description of the FIG. 5 Extract-Servers program given above inasmuch as absent any traffic involving well-known ports, the same results will be obtained in both cases.

It will also be appreciated that when the traffic associated with a server is disabled (for example, in step 35 of FIG. 5), this involves only disabling the traffic elements for which the node concerned is identified as a server or for which no identification has been made.

Similar considerations apply in relation to how the role information is used in connection with the Move-Suggestions program 11 and the Split-Suggestions program 12.

Various modifications to the above-described network analysis method are, of course, possible. Thus, although the method has been described in relation to a network made up of sub-networks formed by logical segments at level 2 of the seven-layer OSI Reference Model, the method can also be applied to networks where the sub-networks take other forms, for example, groupings of nodes separated by routers/ gateways operating at level 3 of the seven-layer OSI Reference Model.

Furthermore, the three primary analysis tasks represented by the Extract-Servers program 10, the Move-Suggestions program 11, and the Split-Suggestions program 12, can be operated independently provided appropriate starting information is provided. Thus, the Move-Suggestions analysis task can be carried out independently of the Extract-Servers task provided that the Move-Suggestions task is provided with a list of local servers and their clients and with appropriate traffic data. Similarly, the Split-Suggestions task can also be carried out independently of the Extract-Servers task; indeed, the Split-Suggestions task could be carried out independently of the Move-Suggestion task provided that either equivalent workgroup information was made available from elsewhere, or the operation of the Split-Suggestion task was modified to build up workgroups itself. To this end, data on traffic internal to the sub-network concerned may be analyzed to classify nodes on the sub-network into workgroups by an iterative process that involves for each iteration:

- allocating the node with the greatest traffic linkage to a respective new workgroup as a local server;
- further allocating as client nodes to the same workgroup those nodes whose linkage to the local server node is greater than a predetermined portion (i.e. 50%) of the total linkage of the node concerned, and
- modifying the traffic data by removal of traffic associated with the new workgroup.

These workgroups can then be reduced to two in a manner already described and a decision then made as to whether the sub-network can usefully be split.

We claim:

1. A network analysis method for use in relation to a network of the type comprising a plurality of sub-networks each with a plurality of nodes, the method comprising the steps of:
   (1) monitoring the network to collect and store traffic data indicative of linkage between nodes as judged by traffic therebetween, "linkage" meaning a level of interconnectivity between nodes as determined by a quantity of traffic therebetween;
   (2) analyzing said traffic data to identify nodes acting as global servers, a global server being a node which communicates with nodes on plural sub-networks but without communicating predominantly with nodes on one sub-network;
   (3) accessing said stored traffic data and removing traffic data associated with nodes identified as acting as global servers, and identifying nodes acting as local servers by analyzing stored traffic data remaining after said removing, a local server being a node which is a predominant communicator with nodes on one particular sub-network.

2. A method according to claim 1, wherein step (3) involves examining the traffic data to identify any candidate global server amongst said nodes where a candidate global server is a node whose linkage to any of said sub-networks is less than a first predetermined portion of its total linkage to all nodes, and
   where a said candidate global server is identified, identifying the candidate global server with the highest total linkage, removing its associated traffic from the traffic data, and returning to the start of step (3) to repeat the step using the traffic data so modified;
   where no such candidate global server is identified, examining the traffic data to identify any candidate local server amongst said nodes where a candidate local server is a node for which for the sub-network with the highest linkage thereto, this linkage is equal to or greater than a second predetermined portion of the total linkage of that candidate local server, and
   where a said candidate local server is identified, identifying the candidate local server with the highest linkage, recording this candidate as a local server, removing its associated traffic from the traffic data, and returning to the start of step (3) to repeat the step using the traffic data so modified;
   where no said candidate local server is identified, exiting step (3).

3. A method according to claim 2, wherein said first predetermined portion and second predetermined portion are both about a half.

4. A method according to claim 1, wherein said traffic data is stored as traffic elements each providing an indication of traffic between a pair of said nodes, modification of the traffic data to remove traffic associated with a said server being effected by marking the relevant traffic elements as currently disabled.

5. A method according to claim 1, wherein the linkage of a node with other associated nodes is measured in terms of at least one of the following:
   number of associated nodes;
   number of frames involved in the traffic with the associated nodes;
   number of bytes involved in the traffic with the associated nodes.

6. A method according to claim 1, wherein in step (1) of claim 1 the monitoring of the network is carried out in such a manner as to enable role information to be gathered indicative of whether a node is acting in a server or client role in relation to individual traffic items associated therewith, the identification of a node as a global or local server in step (3) being effected without reference to traffic for which the node is acting as a client as indicated by said role information.

7. A method according to claim 6, wherein said role information is derived on the basis of the well known port status of the node end points associated with traffic passed between a pair of nodes, one node of said pair being identified as acting in a server role and the other node in a client role where the end point for said one node is a well known port whilst the other end point is otherwise.

8. A method according to claim 1, wherein for at least one local server identified in step (3), determining an optimum sub-network for said local server, said determining involving assuming a change in location of the local server on each sub-network of said network, in turn, and evaluating for each such location of the local server, an optimal-location function that provides a measure of traffic between sub-networks that would be associated with the local server in a current assumed location, and identifying as said optimum sub-network, that sub-network for which evaluation of said optimal-location function indicates a minimum for said traffic between sub-networks.

9. A method according to claim 8, wherein said optimum-location function is a count of nodes that have communication linkage with said local server and are located on sub-networks other than one corresponding to the said current assumed location of the local server.

10. A method according to claim 8, wherein for a local server whose said optimum sub-network has been determined, determining whether any of the nodes to which said local server has communication linkage as a server on said optimum sub-network, should be moved to said optimum sub-network; said determining including testing for each node whether linkage between that node and the local server is about half or more of the total communication linkage of that node.

11. A method according to claim 1 wherein for the group of local servers identified in step (3), each local server is selected in turn in order of descending linkage and for each such server;
   (i) creating a respective workgroup therefor unless the local server concerned has already been allocated to another workgroup created in respect of a local server higher in said order,
   (ii) if said respective workgroup has been created in (i) for the local server concerned, allocating the server to that respective workgroup, and
   (iii) for any node whose linkage to the local server is about at least half of the total linkage of said node, allocating said node to the same workgroup as the local server.

12. A method according to claim 11, wherein for at least one said sub-network, a determination is made whether it is worthwhile splitting the sub-network into two sub-networks, said determination further comprising the steps of:
   (a) pruning each workgroup that has been created in respect of a local server located on a sub-network of interest, by removing from the workgroup any nodes that are inappropriate to include therein when considering the workgroup only in relation to the sub-network of interest;

(b) forming a respective further workgroup for each node of the sub-network of interest where that node is not already in a workgroup associated with the sub-network;

(c) merging the workgroups associated with the sub-network of interest until only two such workgroups remain; and (d) deciding whether to split the sub-network by comparing an amount of traffic between the two workgroups remaining after step (c) with total traffic associated with each such workgroup.

13. A method according to claim 12, wherein step (a) involves removing from a workgroup being pruned, any node that is located on a different sub-network to the one of interest, and any node whose inclusion in the workgroup relies directly or indirectly on its association with a node located on a different sub-network to the one of interest.

14. A method according to claim 12, wherein step (c) involves an iterative process in which during each iteration, the workgroup with the smallest amount of associated traffic is merged with the workgroup with which it has the greatest linkage.

15. A method according to claim 8 wherein operations specified in claim 8 are carried out using the traffic data collected in step (1) of claim 1 but with all global server traffic removed.

16. A network analysis method for use in relation to a network of the type comprising a plurality of sub-networks each with a plurality of nodes, the method comprising the steps of:

(1) monitoring the network to collect and store traffic data between nodes as indicative of linkage between said nodes, "linkage" meaning a level of interconnectivity between nodes as determined by a quantity of traffic therebetween;

(2) processing the traffic data to identify nodes acting as local servers, a local server being a node which is a predominant communicator with nodes on one particular sub-network; and (3) determining for at least one of the local servers identified in step (2), an optimum sub-network for the at least one local server, said determining assuming a change in location of the at least one local server on each sub-network in turn, and evaluating for each changed location of the at least one local server, an optimal-location function that provides a measure of traffic between sub-networks that would be associated with the at least one local server in an assumed current location, said determining further identifying as said optimum sub-network, that sub-network for which evaluation of said function indicates a minimum of traffic between sub-networks.

17. A network analysis method for use in relation to a network having a logical segment with a plurality of nodes, for the purpose of determining whether it is worthwhile splitting the logical segment into two such segments, the method comprising the steps of:

(1) monitoring the logical segment to collect and store traffic data indicative of the linkage between the nodes of the segment as judged by traffic therebetween;

(2) carrying out a first iterative process for analyzing the segment traffic data to classify said nodes into workgroups each with a local server and one or more client nodes, each iteration of this first iterative process involving allocating the node with the greatest traffic linkage to a respective new workgroup as a local server, further allocating as client nodes to the same workgroup those nodes whose linkage to the local server node is greater than a predetermined portion of the total linkage of the node concerned, and modifying the traffic data by removal of traffic associated with the new workgroup;

(3) carrying out a second iterative process for merging the workgroups identified in step (2) to leave two remaining workgroups, each iteration of this second iterative process involving identifying the workgroup with the smallest amount of associated traffic and merging it with the workgroup with which it has the greatest linkage; and (4) deciding whether it is worthwhile splitting the logical segment by comparing the amount of traffic between the two workgroups left remaining after step (3) with the total traffic associated with each such workgroup.

18. A memory product for enabling a computer means to perform analysis of a network of the type comprising a plurality of sub-networks, each with a plurality of nodes, the memory product comprising:

means for enabling the computer means to monitor the network to collect and store traffic data indicative of linkage between nodes as judged by traffic therebetween, "linkage" meaning a level of interconnectivity between nodes as determined by a quantity of traffic therebetween;

means for enabling the computer means to analyze said traffic data to identify nodes acting as global servers, a global server being a node which communicates with nodes on plural sub-networks but without communicating predominantly with nodes on one sub-network;

means for causing said computer means to access said stored traffic data and to remove traffic data associated with nodes identified as acting as global servers; and means for enabling the computer means to identify nodes acting as local servers by analyzing stored traffic data remaining after said removing, a local server being a node which is a predominant communicator with nodes on one particular sub-network.

19. A memory product for use with a computer means to enable said computer means to analyze a network comprising a plurality of sub-networks each with a plurality of nodes, the memory product comprising:

means for controlling the computer means to monitor the network to collect and store traffic data between nodes as indicative of linkage between said nodes, "linkage" meaning a level of interconnectivity between nodes as determined by a quantity of traffic therebetween;

means for controlling the computer means to process the traffic data to identify nodes acting as local servers, a local server being a node which is a predominant communicator with nodes on one particular sub-network; and means for causing the computer means to determine, for at least one identified node acting as a local server, an optimum sub-network for the at least one identified node, said computer means controlled to assume a change in location of the at least one identified node on each sub-network, in turn, and to evaluate for each changed location, an optimal-location function that provides a measure of traffic between sub-networks that would be associated with the at least one identified node in an assumed current location, and to further identify as said optimum sub-network, that sub-network for which evaluation of said function indicates a minimum of traffic between sub-networks.

* * * * *